April 13, 1943. M. E. SCHWARTZ 2,316,721
COMBINATION MILK FILTER
Filed May 29, 1941
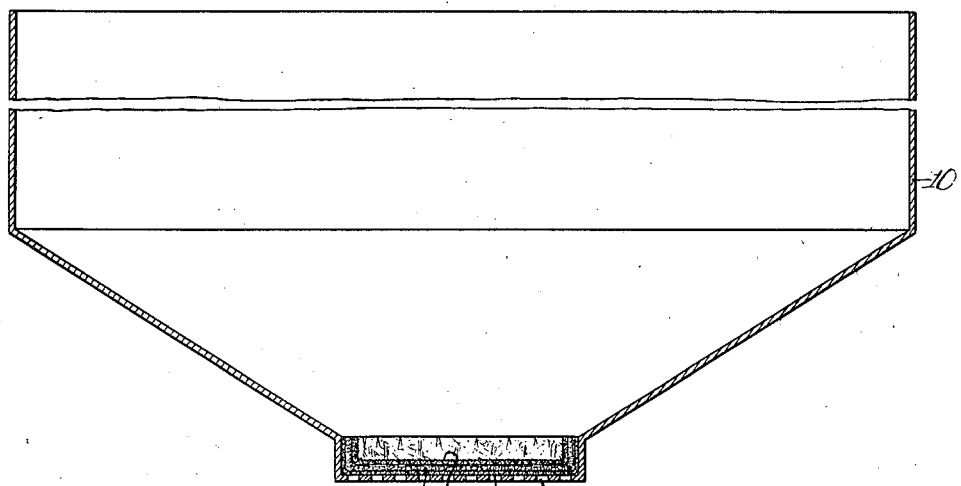
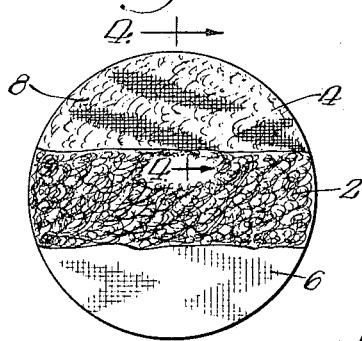
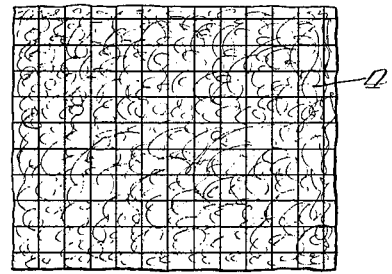
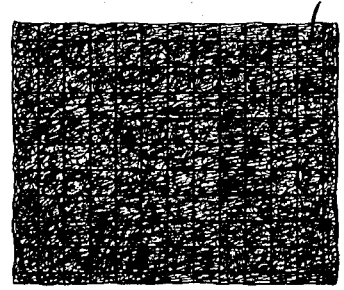
INVENTOR.
Myron E. Schwartz Patented Apr. 13, 1943

2,316,721

UNITED STATES PATENT OFFICE 2,316,721

COMBINATION MILK FILTER

Myron E. Schwartz, Two Rivers, Wis.

Application May 29, 1941, Serial No. 395,727

3 Claims. (Cl. 210—203)

This invention relates to a new and improved combination filter for separating finely divided solids from liquids and more particularly to a combination milk filter for separating fine sediment from milk.

Experience has shown that there is a practical necessity for filtering the milk and to this end various types of milk filters are being used today. The present day types of milk filters are satisfactory for normal conditions, but are not satisfactory when used under severe conditions. In spite of all precautions heretofore taken, it has been found that in some instances a fine sediment will get into the milk which cannot be completely removed by present day methods and filters.

As an example of the simplest type of filter available today, mention may be made of a piece of cloth. This type of milk filter will remove the larger particles of sediment, but will not ordinarily remove the very fine sediment. If the farmer uses a cloth for filtering, he will ordinarily save the cloth and use it repeatedly. If the cloth is not washed properly, the milk may become bacteriologically contaminated from the filter. Very often the farmer who uses a cloth filter does not realize that the amount of fine sediment passing through the cloth may cause his milk to be rejected by the dairy company or distributor. It will, therefore, be apparent that simple cloth filters have certain disadvantages.

Another type of filter which is in use today is made of cotton in a relatively loose absorptive sheet-like form, normally prepared by carding the cotton. This type of filter is intended to be used once and then thrown away, and for the purpose of the present invention is referred to herein as a "single service" filter. The filters of this type which are available today suffer from the disadvantage that the milk will sometimes tend to channel through the cotton, thereby producing a hole and destroying the value of the cotton as a filtering medium. This channeling usually takes place in the average milk filter at the vortex formed by the milk as it runs through the filter. Naturally, once a channel has been formed in the filtering medium, the milk will thereafter tend to follow the line of least resistance with the result that a substantial part of the milk is left unfiltered. Attempts have been made to remedy this channeling effect and to cause the filter to retain its shape, even when wet by covering the cotton with a gauze on one or both sides, but in spite of this the carded cotton milk filters available today fail to function properly in severe cases and under severe conditions.

In general, three factors are of primary importance in making milk filters, namely, speed, capacity and efficiency. The milk must pass through the filter rapidly, or the average farmer will not take the time to filter his milk. The filter must have the capacity or capability of filtering a large volume of milk without the loss of efficiency. As will be apparent, the greater the capacity of the filter the less the cost per unit of filtering. Finally, the filter must function with maximum efficiency to remove fine particles of sediment at a relatively rapid rate with a relatively large volume of milk.

One of the objects of the present invention is to provide a new and improved type of milk filtering medium which will function under severe conditions to remove the finer particles of sediment while retaining speed, capacity and efficiency.

Another object of the invention is to provide a new and improved single service milk filter having increased strength and efficiency and less subject to channeling by the milk during filtration.

Still another object of the invention is to provide a new and improved type of single service milk filter which will maintain its speed of filtration with an increase in the amount of milk being filtered as compared with present day filters of this type.

A further object of the invention is to provide a new and improved type of single service milk filter which has a relatively high capacity without loss of efficiency.

Another object of the invention is to provide a new and improved type of milk filter which functions with such efficiency that it will remove fine sediment where other filters now available have failed.

Other objects and advantages of the invention will be apparent by reference to the following description in conjunction with the accompanying drawing, in which:

Figure 1 represents a sectional view of a metal support or strainer showing the manner in which a single service filter of the type provided in accordance with this invention is preferably used;

Figure 2 represents a plan view with parts broken away of one type of single service milk filter provided in accordance with this invention;

Figure 3 is an exploded view showing the component parts of the elements of the milk filter illustrated in Figure 2;

Figure 4 is a sectional view taken along the line 4—4 of Figure 2, showing the component elements of Figure 3 in their assembled relationship;

Figure 5 is a plan view with parts broken away, showing the cloth element of the filter of Figure 2 alone and then in assembled relationship with the intermediate or carded cotton element in order to illustrate that the effect of combining these two elements is quite different from the effect obtained with either of the elements alone.

Referring to Figures 2, 3 and 4, it will be seen that the preferred embodiment of the invention comprises a filtering medium consisting of a layer 2 of carded fibers, preferably cotton, united on one side with a layer of closely woven napped cloth 4, preferably flannel, and on the other side with a layer of a more open weave material 6, preferably cotton gauze.

As illustrated in Figure 3, the flannel component 4 contains a nap 8. The carded component 2 consists substantially of a sheet of carded cotton with the fibers running in many different directions, that is to say, in transverse planes, in planes normal to the transverse and in oblique or intermediate planes. When the nap 8 of the cloth 4 is brought into contact with the relatively loose fibers of the carded cotton 2, the fibers of the nap intermingle with the fibers of the carded cotton and unite to seal the pores of the flannel. While the weave of the cloth is still discernible from the outer side, the inner boundary line of the nap of the cloth and the fibers of the carded cotton component 2 disappears and there is no substantial tendency for the flannel 4 to separate from the carded cotton 2 in ordinary usage. In fact, the union between the nap of the flannel and the fibers of the carded cotton is so strong that it is difficult to separate the flannel from the carded cotton even by hand pull without leaving a substantial amount of the carded cotton on the flannel. It is known that when milk is cold it becomes more difficult to filter. Flannel functions as a filtering medium better when the milk is cold than the single service carded cotton filters in use today, but the flannel does not function to remove the finer particles of sediment and the known carded cotton filters will not function under the more severe conditions of usage.

The combination milk filters provided in accordance with this invention overcome the disadvantages heretofore attending the use of either flannel alone or carded cotton alone as filtering media. The single service combination milk filters of the present invention will function with excellent efficiency, speed and capacity when the milk is either cold or warm. The type of filter provided in accordance with this invention takes advantage of the best qualities of the flannel and the carded cotton, while overcoming the disadvantages of each separately. The milk filters of the present invention will function under severe or harsh conditions where presently available filters will fail.

Single service filters of the type provided in accordance with this invention are normally used in conjunction with a support strainer or holder such as shown in Figure 1. This support consists primarily of a generally funnel-shaped member 10 provided with a perforated opening or screen 12. The milk filter is preferably placed over the perforated opening 12 in the manner shown in Figure 1, with the flannel side 4 of the filter uppermost. In some instances the filter might be used in the reversed position, but tests made with the filter indicate that it functions with greater speed, capacity and efficiency when used in the manner illustrated in Figure 1. This particular arrangement of the filter in the milk strainer is therefore of outstanding importance. The gauze layer 6 serves to prevent the carded cotton 2 from passing through the holes or perforations of the strainer 12 during filtration. It serves the additional purpose of providing a smooth surface which will not tend to cling or adhere when a number of the filters are stacked for shipment. In some instances, or for some purposes, the gauze layer 6 may be omitted, but this does not represent a preferred embodiment of the invention.

Figure 5 has been included to illustrate the manner in which the fine fibers of the carded cotton layer 2, when united with the nap of the flannel 4, close the pores of the flannel, thus making possible an improved result which is not obtainable by either of the separate components. The flannel alone has the requisite speed, but not the efficiency. The cotton has efficiency but not capacity. A combination of the flannel, carded cotton and the gauze has speed, capacity and efficiency. Inasmuch as a larger bulk or volume of milk can be filtered with the single service filters of the present invention, it will be apparent that the cost per unit becomes less as compared with single service filters of the type now in use.

In constructing the filters of the present invention, a sizing material such as starch, or other vegetable sizing, may be applied to the flannel, to the carded cotton, or to both, in order to unite the nap of the flannel with the fibers of the carded cotton more firmly. A sizing may also be applied to the other surface of the carded cotton which is in contact with the gauze, or to the gauze, or both in order to increase the adherence of the gauze to the carded cotton, or for other reasons. However, it is the intermingling of the nap of the flannel and the fibers of the carded cotton which is most effective in preventing the separation of these two components from each other. The adhesive effect of the sizing when added to the intermingling of the fibers produces a construction which will not separate under ordinary conditions of usage, even when the filter is wet. It will be recognized that this is very desirable, because otherwise, during the filtration, the various components of the filter might tend to separate and float away, thereby reducing their efficiency, this being particularly true of the component of the filter which is uppermost in the milk strainer.

Having thus described the invention, what I claim as new and desire to secure by Letters Patent of the United States is:

1. A single service milk filtering medium consisting of a layer of flannel having a nap thereon, a layer of carded cotton closely associated and joined to said flannel with the fibers of the cotton intermingled with the nap of the flannel, and a layer of cotton gauze joined to the other side of said layer of carded cotton.

2. A single service milk filtering medium consisting of a layer of carded cotton united on one side with a napped fabric and having the cotton fibers intermingled with the nap of said fabric and united on the other side with a layer of gauze, said napped fabric being more closely woven than said layer of gauze, and said carded cotton covering the pores of said fabric.

3. In combination with a milk strainer having a straining area comprising perforations through which the milk passes, a milk filtering medium disposed over said perforations and consisting of an upper layer of flannel, an intermediate layer of carded cotton united therewith, and a lower layer of gauze united with said carded cotton and adjacent the perforations of said strainer.

MYRON E. SCHWARTZ.